United States Patent
Sanchez et al.

(10) Patent No.: US 9,106,733 B2
(45) Date of Patent: Aug. 11, 2015

(54) SIMULTANEOUS VOICE-LONG TERM EVOLUTION DUAL ANTENNA SYSTEM

(71) Applicant: Futurewei Technologies, Inc., Plano, TX (US)

(72) Inventors: Jorge Fabrega Sanchez, San Diego, CA (US); Chul Min Han, San Diego, CA (US); Kiran Vanjani, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 132 days.

(21) Appl. No.: 13/730,245

(22) Filed: Dec. 28, 2012

(65) Prior Publication Data

US 2014/0187284 A1    Jul. 3, 2014

(51) Int. Cl.
    *H04M 1/24*    (2006.01)
(52) U.S. Cl.
    CPC ..................................... *H04M 1/24* (2013.01)
(58) Field of Classification Search
    CPC .......................... H04M 1/72522; H01Q 3/2605
    USPC ............... 455/550.1, 90.3, 333, 129; 342/368
    See application file for complete search history.

(56) References Cited

U.S. PATENT DOCUMENTS

| | | | |
|---|---|---|---|
| 2005/0170790 A1* | 8/2005 | Chang et al. | 455/90.3 |
| 2013/0045700 A1* | 2/2013 | Stallman et al. | 455/129 |
| 2013/0077556 A1* | 3/2013 | Gore et al. | 370/315 |

OTHER PUBLICATIONS

Motorola Mobility, Inc., "Portable Cellular Phone SAR Test Report" Test Report No. 24954-1F, ADR Test Services Laboratory, Test Date Mar. 27, 2012 to Jul. 6, 2012; 51 pages.
Compliance Certification Services (UL CCS), "SAR Evaluation Report", Report No. 11U13896-5B, Oct. 1, 2011, 95 pages.
Rafati, Hamid, et al., "A Receiver Architecture for Dual-Antenna Systems", IEEE Journal of Solid-State Circuits, vol. 42, No. 6, Jun. 2007, 9 pages.
Zhang, Ling, et al., "A Triple-Standard Transceiver Architecture for GSM, WCDMA and WI-FI Applications", 12th IEEE International Conference, Dec. 2005, 4 pages.
Gu, Wang-Chang Albert, "Integration of RF Front-End Modules in Cellular Handsets", IEEE 2004, 6 pages.

* cited by examiner

*Primary Examiner* — Phuoc H Doan
(74) *Attorney, Agent, or Firm* — Conley Rose, P.C.; Grant Rodolph; William H. Dietrich

(57) ABSTRACT

A mobile device may include a first antenna and a second antenna. A first radio frequency (RF) transceiver may be coupled to the first antenna, and a second RF transceiver may be coupled to the second antenna. A baseband chipset may be coupled to the first RF transceiver and the second RF transceiver. One or more switches may be connected within a first transmit path, a second transmit path, a first receive path, and a second receive path, wherein one or more of the first transmit path, the second transmit path, the first receive path, and the second receive path associated with the coupling of one or more of the first antenna, the second antenna, the first RF transceiver, the second RF transceiver, and the baseband chipset.

13 Claims, 9 Drawing Sheets

SIMULTANEOUS VOICE-LONG TERM EVOLUTION DUAL ANTENNA SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices receiving cellular communication services continue to spread geographically and rise in popularity. There is a continued drive to make the handsets both more compact and more reliable. Good radio reception continues to be a concern with carriers and their customers. Dropped calls and poor signals frustrate customers, and may deprive carriers of potential billing opportunities. Continued improvement in signal quality is the focus of research and innovation.

SUMMARY

The disclosure relates to a mobile device which may include a first antenna and a second antenna. A first radio frequency (RF) transceiver may be coupled to the first antenna, and a second RF transceiver may be coupled to the second antenna. A baseband chipset may be coupled to the first RF transceiver and the second RF transceiver. One or more switches may be connected within a first transmit path, a second transmit path, a first receive path, and a second receive path, wherein one or more of the first transmit path, the second transmit path, the first receive path, and the second receive path associated with the coupling of one or more of the first antenna, the second antenna, the first RF transceiver, the second RF transceiver, and the baseband chipset.

The disclosure relates to a mobile device comprising a baseband chipset having a code division multiple access (CDMA) transmit port and a CDMA receive port for CDMA communications, and an Long Term Evolution-Data Optimized (LTE/DO) transmit port and an LTE/DO receive port for LTE/DO communications. The mobile device may also have a first antenna and a second antenna, each antenna configured for both CDMA and LTE/DO communications. The mobile device may also have a switch arrangement configured to selectively couple the first antenna with one of the CDMA transmit port and the CDMA receive port, and the LTE/DO transmit and the LTE/DO receive port. The switch arrangement may further be configured to selectively couple the second antenna with one of the CDMA transmit port and the CDMA receive port, and the LTE/DO transmit and the LTE/DO receive port.

The disclosure relates to a method comprising receiving over a first RF link with a first radio transceiver a voice transmission signal through a first antenna of a mobile device, and receiving over a second RF link with a second radio transceiver a data transmission signal through a second antenna of the mobile device. The method may further include evaluating the quality of the first RF link using first signals received through the first antenna wherein the first signals may include first voice signals and first data signals, and evaluating the quality of the second RF link using second signals received through the second antenna, wherein the second signals may include second voice signals and second data signals. The first voice signals received on the first antenna may be substantially the same as the second voice signals received on the second antenna, or they may be different signals received at different times. The first data signals received on the first antenna may be substantially the same as the second data signals received on the second antenna, or they may be different signals received at different times. If the quality RF link of the second RF link is higher than the quality of the first RF link, the voice transmission signal may be received through the second antenna and the data transmission signal may be received through the first antenna. If the quality RF link of the first RF link is higher than the quality of the second RF link, the voice transmission signal may continue to be received through the first antenna, and the data transmission signal may continue to be received through the second antenna.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
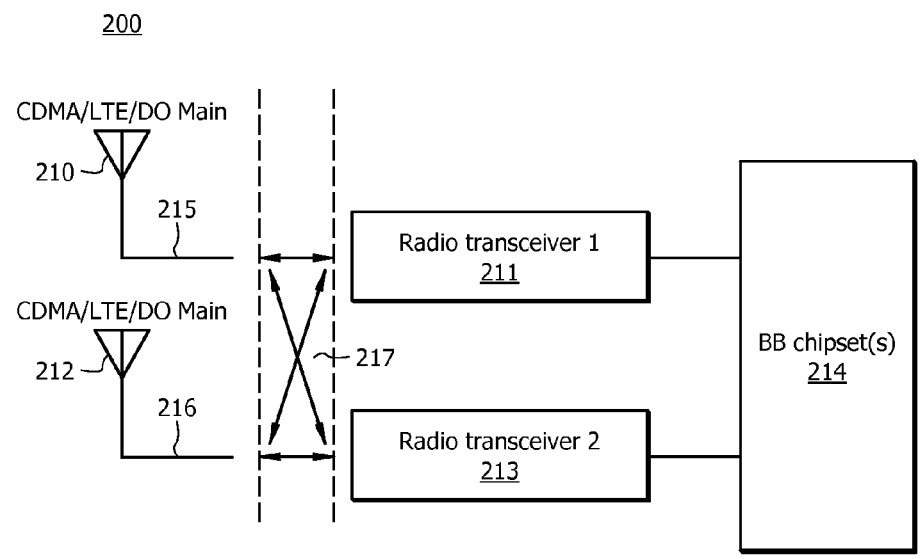
FIG. 1 illustrates a mobile device using two antennas and two separate transceivers.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Carriers may use the same bands for all the technologies since they have limited spectrum. So for example, Carrier A could have a 1x system, Evolution-Data Optimized (EVDO) system and a Long Term Evolution (LTE) system operating in the same frequency band. Examples of systems and bands are 1x code division multiple access (CDMA): BC0/BC1/BC15; EVDO: BC1/BC15; and LTE: B2/B4. Note: B2 is equivalent to BC1 in terms of spectrum (1850-1990 MHz), while B4 is equivalent to BC15 (1710-1755 MHz and 2110-2155 MHz).

The present disclosure provides, in at least one embodiment, a Simultaneous Voice (SV) Long Term Evolution (LTE) mobile device (which may be referred to as an SV-LTE mobile device or merely mobile device) that includes two antennas that can transmit and receive signals in the same frequency band(s) that are used for these different systems.

The mobile device according to the present disclosure may assign antennas based on different factors. For example, in a single mode of operation the mobile device of the present disclosure, which may include only LTE, EVDO, or 1x, may assign the antenna with highest receive signal strength to the active mode system. The other antenna may be assigned to idle-mode. In SV-LTE or SV-EVDO modes, the choice may be to assign the antenna with highest receive signal strength to the voice system and assign the other antenna to the data system.

The location of the handset relative to the user's hand and/or head may also be considered. When the goal is head and hand performance optimization, for example, in the single mode only (LTE, EVDO, or 1x), the choice may be to assign the antenna with the best performance, according to a head relative location estimation algorithm, to the active mode. The other antenna may be idled. In SV-LTE or SV-DO modes, the choice may be to assign the antenna with best performance, according to a head relative location estimation algorithm, to the voice system and assign the other antenna to the data system. The two available antennas may be assigned to the voice and/or data systems using the user head relative handset location estimation described in detail in a co-pending U.S. patent application Ser. No. 13/673,872, which is incorporated herein by reference.

Assignment of antennas may be based on different factors including RF link conditions. In simultaneous operation mode, if a first system is about to lose the radio link while the second system has sufficient link quality, the antenna with better link quality could be assigned to the first system to maintain the radio link. Other assignments and considerations may be addressed in other embodiments.

FIG. 1 illustrates a mobile device 200 using two antennas 210, 212 and two separate transceivers 211, 213 which may be used depending on different factors such as signal conditions, signal quality indicators, and/or input from device sensors. The present embodiment provides the mobile device 200 with the plurality of antennas 210, 212, a plurality of transmit and receive paths 215, 216, the plurality of radio transceivers 211, 213, a baseband chipset 214, and a switch 217. The switch 217 is configured to change the assignment of antennas to transmission and reception paths. More particularly, in a system with at least two antennas 210, 212 and at least voice traffic and data traffic, the switch 217 may be used to assign the antenna with the best radio frequency (RF) link to the voice traffic, and the other antenna to the data traffic, for example.

Figure 2:
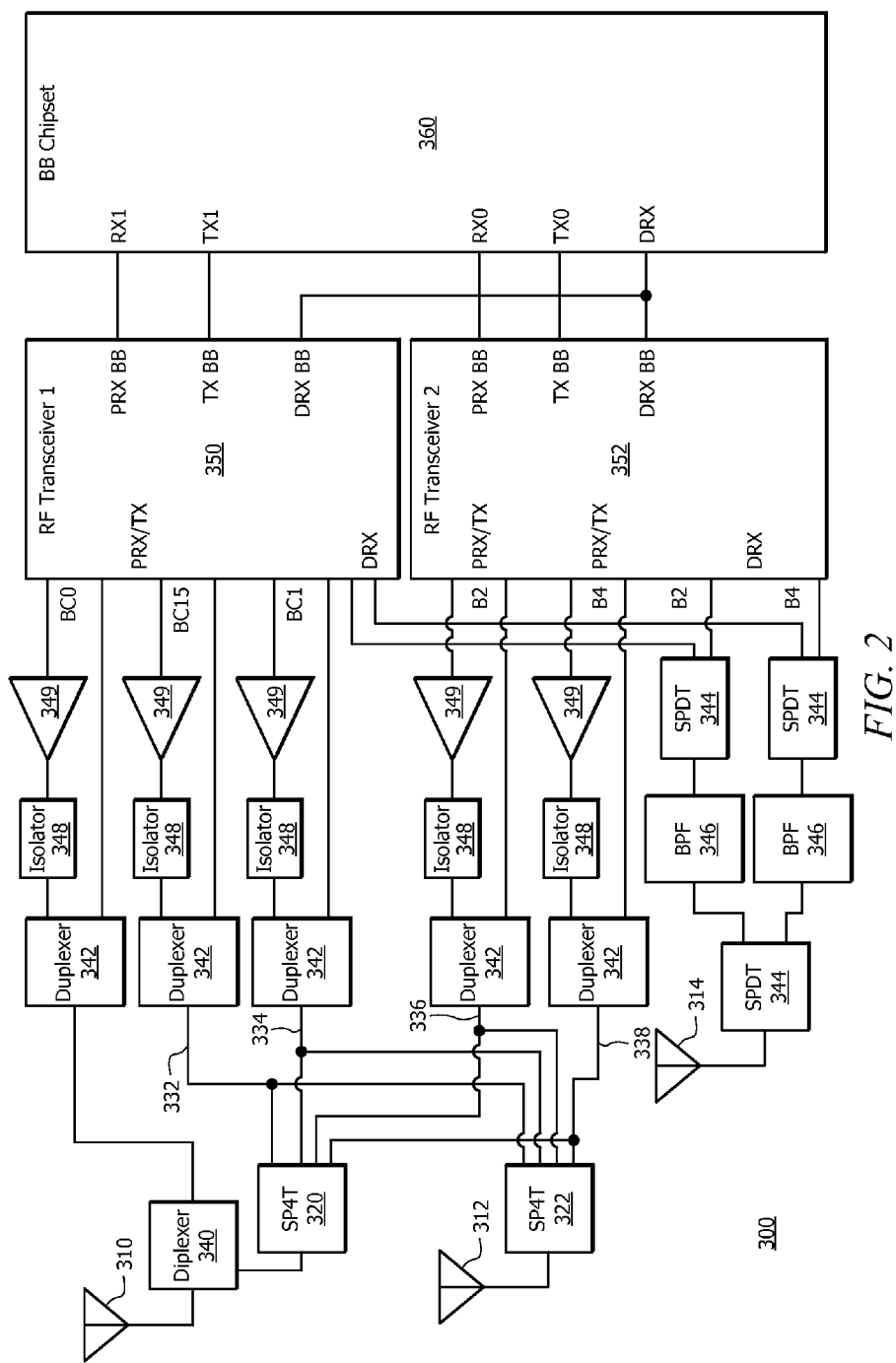
FIG. 2 illustrates another embodiment of a Simultaneous Voice-Long Term Evolution (SV-LTE) mobile device capable of dynamically configuring the antenna-to-transceiver paths.
Figure 3:
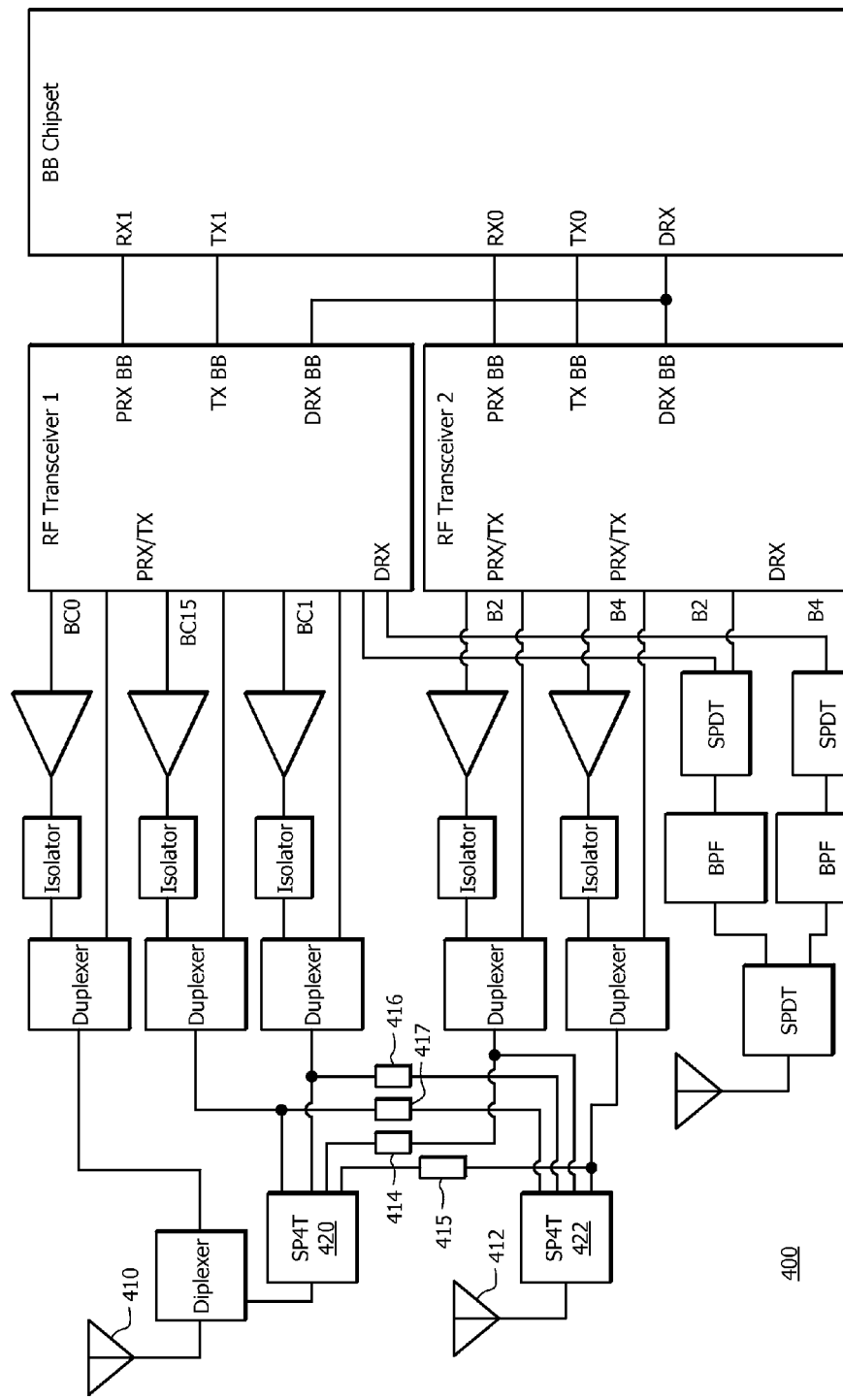
FIG. 3 illustrates another embodiment of an SV-LTE mobile device capable of dynamically configuring the antenna-to-transceiver paths.

FIG. 2 illustrates an embodiment detailing features in a mobile device 300. FIG. 3 illustrates a first CDMA/LTE/DO main antenna 310, and a second CDMA/LTE/DO main antenna 312 in a plurality of transmit and receive paths in the mobile device 300. A first single pole four throw (SP4T) switch 320 may connect the first antenna with one of four transmit/receive (Tx/Rx) paths 332, 334, 336, and 338. A second SP4T switch 322 may connect the second antenna with one of four Tx/Rx paths 332, 334, 336, and 338. The actuation of the SP4T switches 320, 322 may be controlled by a programmed method, such as method 900 illustrated in FIG. 8. The control of SP4T switches 320, 322 may be physically controlled by a specially configured processor such as processor 820 illustrated in FIG. 8. One or more diplexers 340 may be used to separate different bands (e.g. BC0, BC15, BC1, etc.) transmitted and/or received from antenna 310. A plurality of duplexers 342 may be used to filter transmit and receive signals. A plurality of isolators 348 may be used to further isolate transmitted signals. A plurality of amplifier/followers 349 may be used to condition the signal in the transmission path. Other antennas for different functions may also be present in the system, such as antenna 314, used in an exemplary embodiment as a discontinuous reception (DRX) antenna. Other switches 344, filters 346, and associated Tx/Rx elements may also be present in the system.

A first RF transceiver 350 may be coupled to the first antenna 310 and second antenna 312 through the switches 320, 322. The first transceiver 350 may be configured to transmit and receive on one or more bands, for example, BC0, BC15, BC1, or other bands according to availability and use by telephone carriers. A second RF transceiver 352 may be coupled to the first antenna 310 and second antenna 312 through the switches 320, 322. The second RF transceiver 352 may be assigned and configured for the same bands and/or different bands as RF transceiver 350.

The first RF transceiver 350 and the second RF transceiver 352 may have input and output ports for coupling to circuitry associated with the antennas 310, 312, and 314. The first RF transceiver 350 and the second RF transceiver 352 may also have input and output ports for coupling to the baseband (BB) chipset 360. The BB chipset 360 may be embodied as a system-on-a-chip (SOC), an application specific IC (ASIC) or a plurality of chips and components that allow the handset to transmit and receive data and voice traffic. The BB chipset 360 may have a plurality of transmit ports Tx0, Tx1, and a plurality of receive ports Rx0, Rx1. Additional transmit and/or receive ports may be present and/or used in the BB chipset 360. For example, DRX ports may be present on RF transceivers 350, 352 and the BB chipset 360 in order to enable discontinuous reception functionality on the system 300.

FIG. 3 illustrates a mobile device 400 that is similar in some respects to the mobile device illustrated in FIG. 2 and has many common components. The similar components and configurations will not be repeated for brevity. The mobile device 400 is configured with two SP4T switches 420, 422 for switching the four Tx/Rx paths. Incorporated into each of the four paths is a single pole single throw (SPST) switch, 414, 415, 416, and 417. The SPST switches 414, 415, 416, and 417 may each be used to change the effective trace or line length in the different Tx/Rx paths. FIG. 3 illustrates another embodiment of a mobile device capable of dynamically configuring the antenna-to-transceiver paths.

Figure 4:
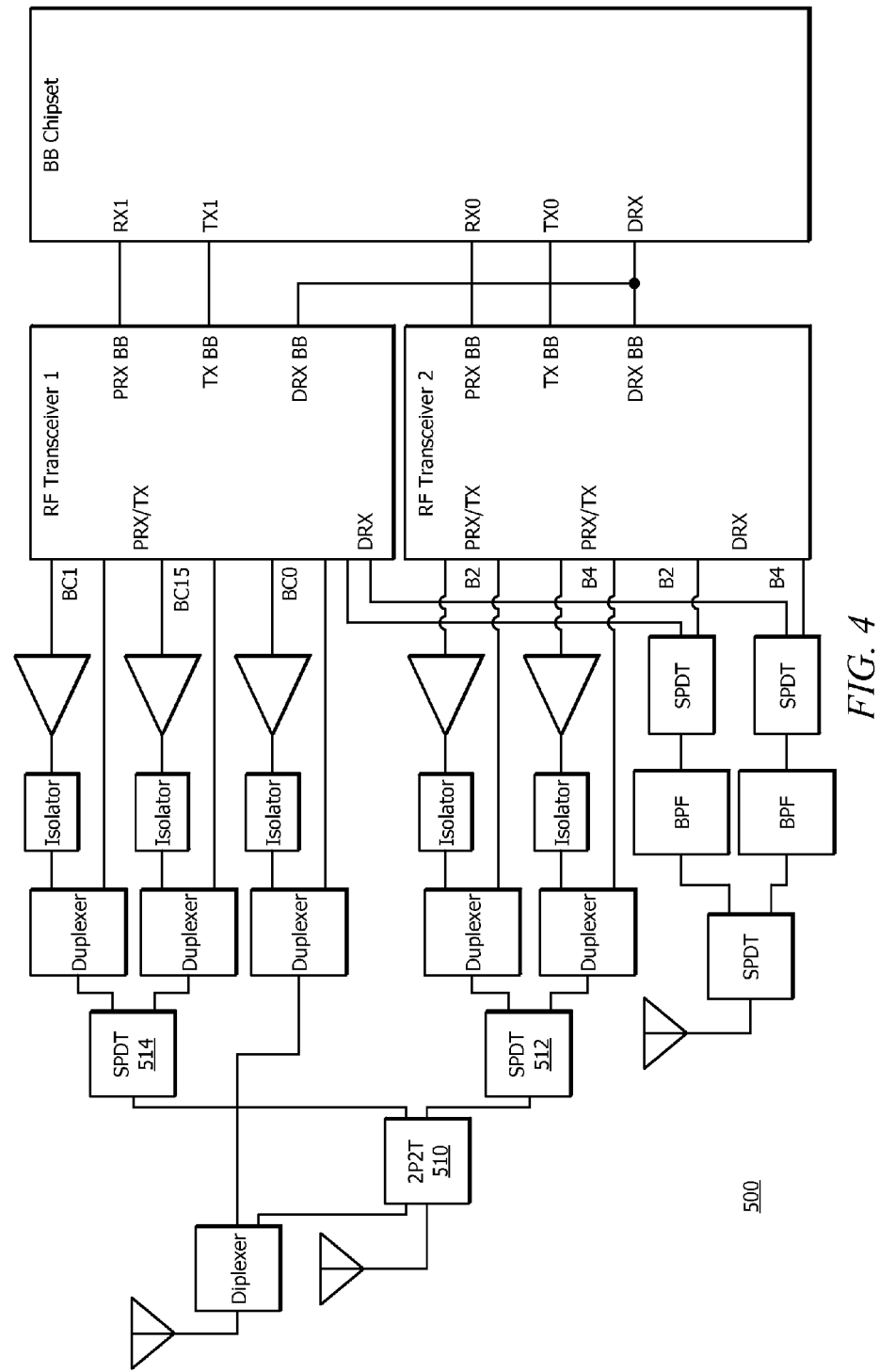
FIG. 4 illustrates another embodiment of an SV-LTE mobile device capable of dynamically configuring the antenna-to-transceiver paths.

FIG. 4 illustrates a mobile device 500 that is similar in some respects to the mobile device illustrated in FIG. 2 and has many common components. The similar components and configurations will not be repeated for brevity. The mobile device 500 is configured with a switching arrangement including a double pole double throw (2P2T) switch 510 connected to two single pole double throw (SPDT) switches 512, 514. FIG. 4 illustrates another embodiment of a mobile device configuration capable of dynamically configuring the antenna-to-transceiver paths.

Figure 5:
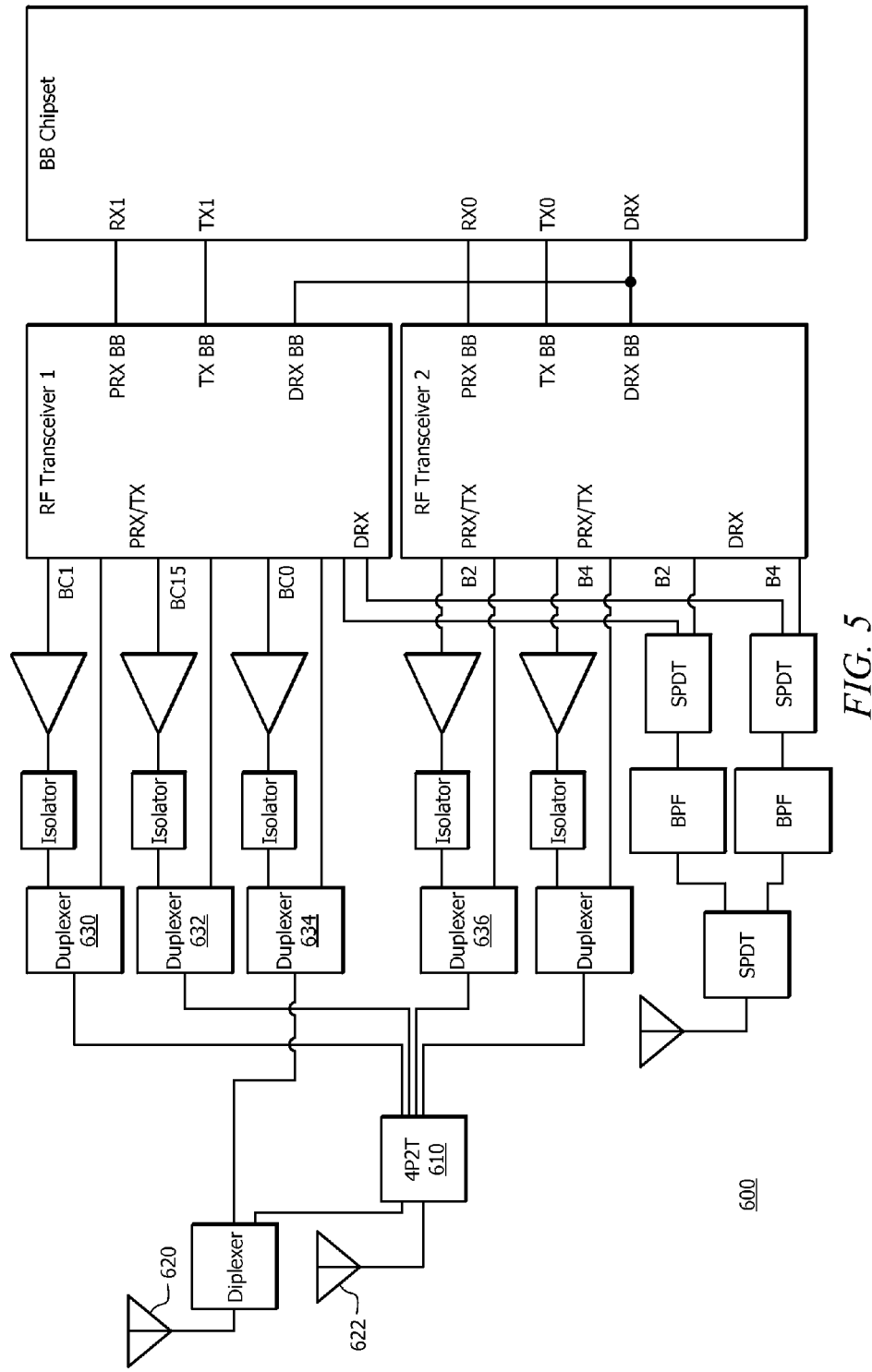
FIG. 5 illustrates another embodiment of an SV-LTE mobile device capable of dynamically configuring the antenna-to-transceiver paths.

FIG. 5 illustrates a mobile device 600 that is similar in some respects to the mobile device illustrated in FIG. 2 and has many common components. The similar components and configurations will not be repeated for brevity. The mobile device 600 is configured with a four pole two throw (4P2T) switch 610 connected between antennas 620 and 622 and duplexers 630, 632, 634, and 636. The embodiment shown in FIG. 5 is yet another configuration of a mobile device capable of dynamically configuring the antenna-to-transceiver paths.

Figure 6:
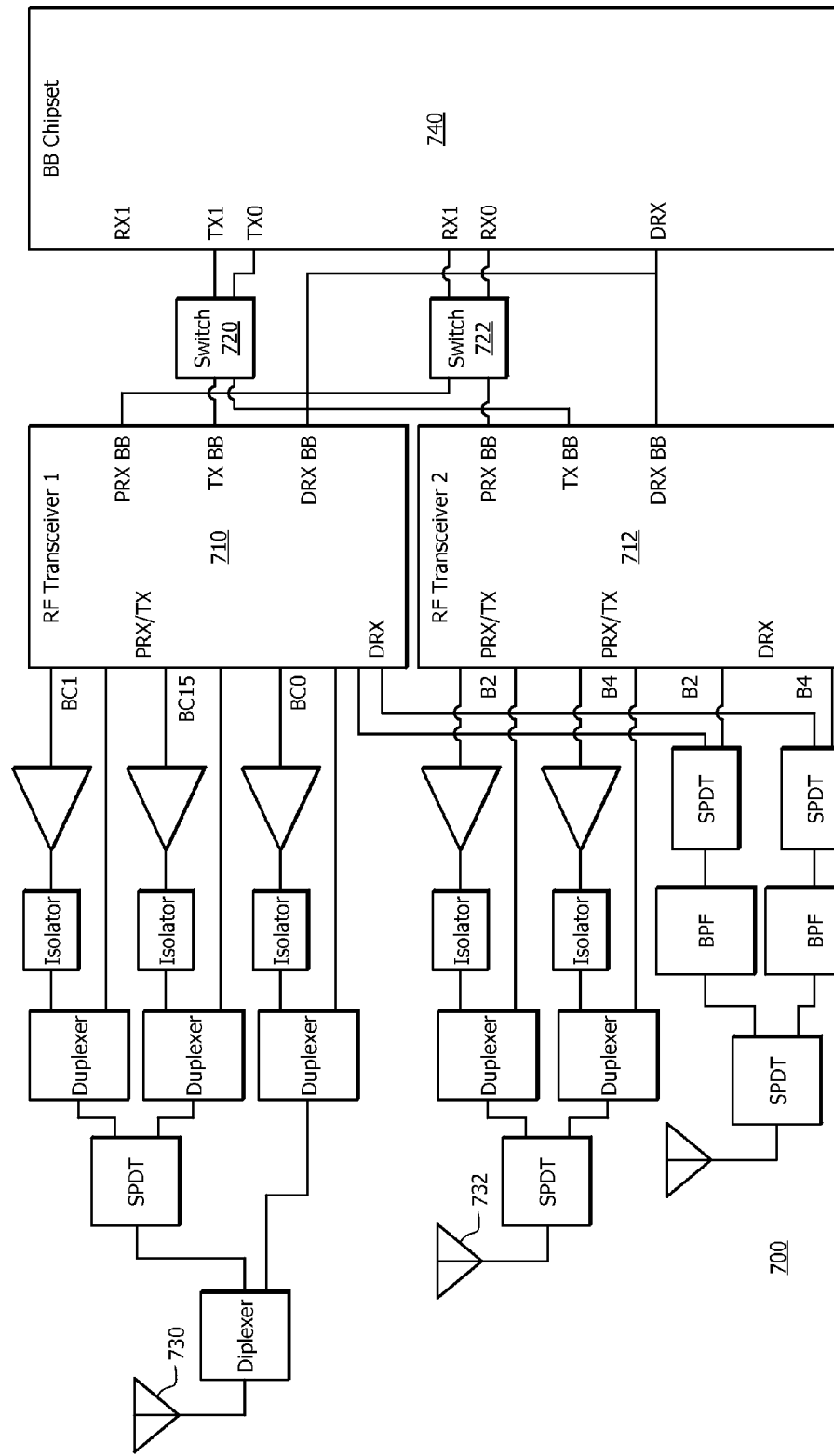
FIG. 6 illustrates another embodiment of an SV-LTE mobile device capable of dynamically configuring the antenna-to-transceiver paths.

FIG. 6 illustrates a mobile device 700 that is similar in some respects to the mobile device illustrated in FIG. 2 and has many common components. The similar components and configurations will not be repeated for brevity. The mobile device 700 is configured with a switching arrangement provided between the RF transceiver 710 and the RF transceiver 712 and the BB chipset 740. The switching arrangement may include a first switch 720 and a second switch 722 that route, transmit and receive signals along different transmit paths and receive paths to different transceivers, and ultimately to different antennas 730 and 732. FIG. 6 illustrates another embodiment of a mobile device capable of dynamically configuring the paths in order to enable dynamic and flexible use and assignment of antennas 730, 732, transceivers 710, 712, and the BB chipset 360 functionality.

Figure 7:
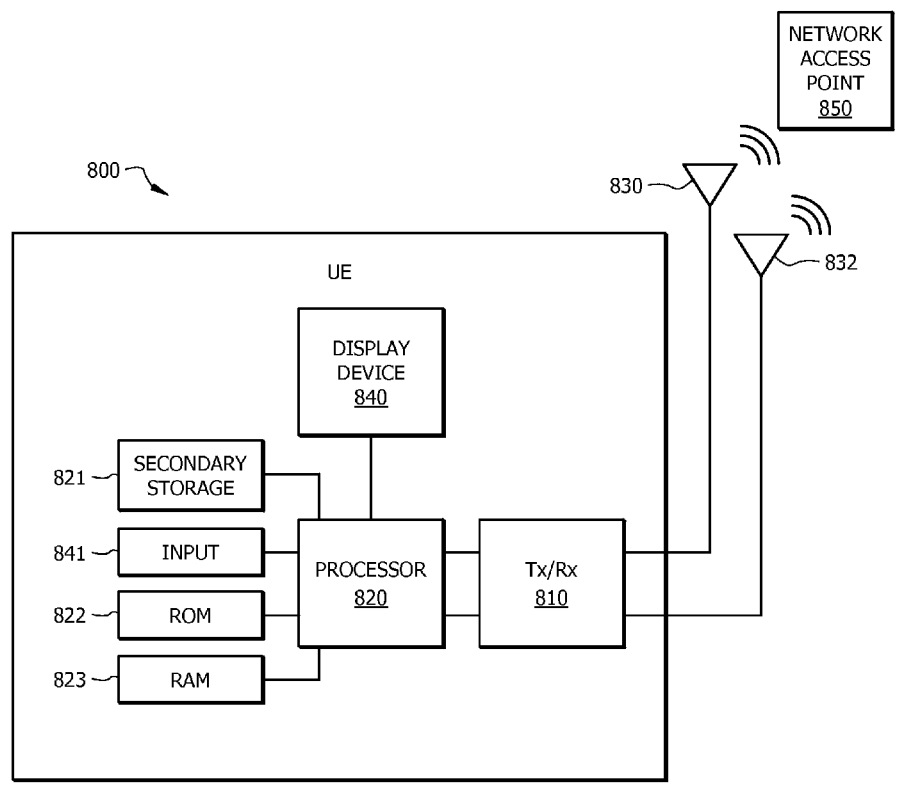
FIG. 7 illustrates a schematic diagram of an embodiment of a mobile device or user equipment.

FIG. 7 illustrates a schematic diagram of an embodiment of a mobile device or user equipment (UE) 800. The terms "mobile device" and "UE" may be used interchangeably herein. UE 800 may comprise a two-way wireless communication device having voice and data communication capabilities. The UE 800 generally has the capability to communicate with other UEs and computer systems on the Internet. Depending on the exact functionality provided, the UE 800 may be referred to as a data messaging device, a two-way pager, a wireless e-mail device, a cellular telephone with data messaging capabilities, a wireless Internet appliance, a wireless device, a smart phone, a mobile device, and/or a data communication device, as examples.

UE 800 may comprise a processor 820 (which may be referred to as a central processor unit or CPU) that is in communication with memory devices including secondary storage 821, read only memory (ROM) 822, and random access memory (RAM) 823. The processor 820 may be implemented as one or more general-purpose processors running software on one or more cores (e.g., a multi-core processor), or may be part of one or more ASICs and/or digital signal processors (DSPs). The processor 820 may be configured to implement in whole or in part any of the schemes described herein, for example, method 900 may be implemented using hardware, software, firmware, or combinations thereof.

The secondary storage 821 may be comprised of one or more solid state drives, disk drives, and/or other memory types and is used for non-volatile storage of data and as an over-flow data storage device if RAM 823 is not large enough to hold all working data. Secondary storage 821 may be used to store programs that are loaded into RAM 823 when such programs are selected for execution. The ROM 822 may be used to store instructions and perhaps data that are read during program execution. ROM 822 may be a non-volatile memory device may have a small memory capacity relative to the larger memory capacity of secondary storage 821. The RAM 823 may be used to store volatile data and perhaps to store instructions. Access to both ROM 822 and RAM 823 may be faster than to secondary storage 821.

The UE 800 may communicate data (e.g., packets) wirelessly with a network via a network access point 850. As such, the UE 800 may comprise a transceiver Tx/Rx 810. Any of the transceivers in FIGS. 1-6 may be used as embodiments of Tx/Rx 810. The baseband chipset in each of FIGS. 1-6 may be embodied as part of the processor 820 or as one or more separate components. Tx/Rx 810 may be configured for receiving data (e.g. wireless packets or frames) from other components. The Tx/Rx 810 may be coupled to the processor 820, which may be configured to process the data and determine to which components the data is to be sent. The Tx/Rx 810 may also be configured for transmitting data to other components, for example by using protocols such as Institute of Electrical and Electronics Engineers (IEEE) 802.11, IEEE 802.16, 3rd Generation Partnership Project (3GPP), Global System for Mobile Communications (GSM), protocols mentioned in connection with FIGS. 2-7, or similar wireless protocols. The Tx/Rx 810 may be coupled to a plurality of antennas 830 and 832 (and additional, not explicitly shown), which may be configured to receive and transmit wireless radio frequency (RF) signals.

The UE 800 may also comprise a device display 840 coupled to the processor 820, that displays output thereof to a user. The UE 800 and the device display 840 may be configured to display representations of data to a user. The device display 820 may comprise a Color Super Twisted Nematic (CSTN) display, a thin film transistor (TFT) display, a thin film diode (TFD) display, an organic light-emitting diode (OLED) display, an active-matrix OLED display, or any other display screen. The device display 840 may display in color or monochrome and may be equipped with a touch sensor based on resistive and/or capacitive technologies.

The UE 800 may further comprise an input device 841 coupled to the processor 820, which may allow the user to input commands to the UE 800. In the case that the display device 840 comprises a touch sensor, the display device 840 may also be considered the input device 841. In addition to and/or in the alternative, an input device 841 may comprise a mouse, microphone, tilt sensor, accelerometer, scanner, camera, trackball, built-in keyboard, external keyboard, and/or any other device that a user may employ to interact with the UE 800.

It is understood that by programming and/or loading executable instructions onto the UE 800, at least one of the processor 820, the ROM 822, the RAM 823, secondary storage 821, and Tx/Rx 810 are changed, transforming the UE 800 in part into a particular machine or apparatus, e.g., a multi-antenna mobile device, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 8:
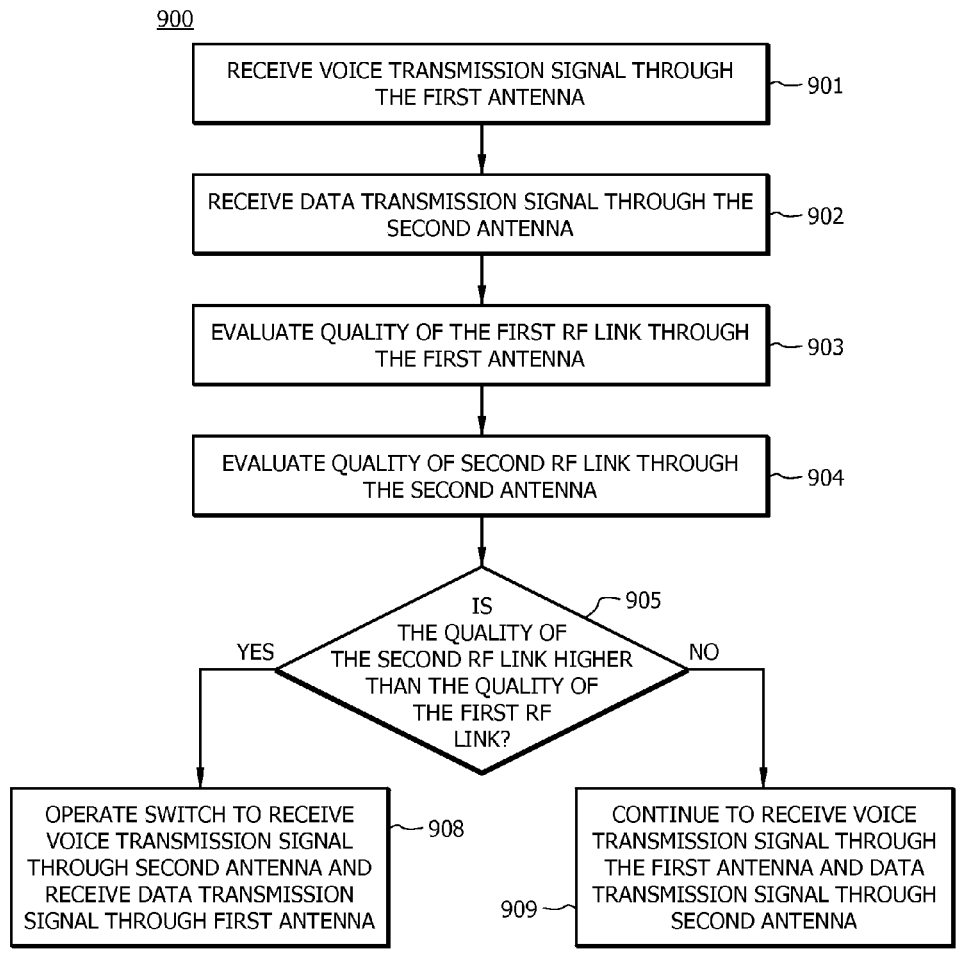
FIG. 8 illustrates a method which may be used to control the switches in any of the mobile devices illustrated in FIGS. 1-6.

FIG. 8 illustrates a method 900 which may be used to control the switches in any of the mobile devices 200, 300, 400, 500, 600, and 700 illustrated in FIGS. 1-6. The method begins with a process on a mobile device including receiving a voice transmission signal through the first antenna at 901. The mobile device may also receive a data transmission signal through the second antenna at 902. The mobile device may evaluate the quality of the first RF link being received by the first antenna at 903. The first link may be evaluated using signals associated with the voice transmission signal. The mobile device may evaluate the quality of the second RF link through the second antenna at 904, using second signals being received by the second antenna. The second signals may include signals associated with the data transmission signal.

The mobile device may then decide whether the quality of the second RF link is higher than the quality of the first RF link at 905. If the quality of the link is higher, the mobile device may operate a switch arrangement to receive a voice transmission signal through the second antenna and receive a data transmission signal through the first antenna at 908. In some embodiments, the method at 908 may include switching a first signal pathway to connect the first antenna to the second transceiver, and switching a second signal pathway to connect the second antenna to the first transceiver. In alternative embodiments, the method at 908 may include switching at least one of signal pathway between the first transceiver and a baseband chipset, and switching at least one signal pathway between the second transceiver and the baseband chipset.

If at 905 the second link is not higher quality, then the method proceeds to 909 and the mobile device may continue to receive the voice transmission signal through the first antenna and the data transmission signal through the second antenna at 909.

Figure 9A:
FIG. 9A and FIG. 9B illustrate the mobile device is illustrated being held by a user in two different positions.
Figure 9B:

In FIG. 9A and FIG. 9B, the mobile device is illustrated as being held by a user in two different positions. The mobile device may include first antenna 1010 and second antenna 1012 which may have a higher or lower link quality depending on such factors as nearby objects, including a user's hand and a user's head. Other nearby objects may affect the quality of the link. For example, the orientation of the mobile device in space with respect to base station antennas may affect the quality of the RF link. In FIGS. 9A and 9B, the performance of a second antenna may be better when the user holds the phone on the right side of the user's head since the second antenna has less head and hand blockage. These and other factors may be a consideration when assigning antennas, transceivers, and paths in the mobile device of the present disclosure. The mobile devices 200, 300, 400, 500, 600, and 700 may flexibly adapt to changing conditions in order to choose which antenna 1010 and 1012 to assign to voice traffic, and which antenna 1010 and 1012 to assign to data traffic, for example.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A mobile device comprising:
   a first antenna;
   a second antenna;
   a first radio frequency (RF) transceiver coupled to the first antenna;
   a second RF transceiver coupled to the second antenna, wherein the second RF transceiver is physically separate and independent from the first RF transceiver;

a baseband chipset coupled to the first RF transceiver and the second RF transceiver; and at least one switch connected within a first transmit path, a second transmit path different than the first transmit path, a first receive path, and a second receive path, wherein one or more of the first transmit path, the second transmit path, the first receive path, and the second receive path associated with the coupling of one or more of the first antenna, the second antenna, the first RF transceiver, the second RF transceiver, and the baseband chipset.

2. The mobile device according to claim 1, wherein the first transmit path and second transmit path are configured to selectively pass signals from the baseband chipset to the first antenna and second antenna via the first RF transceiver and the second RF transceiver.

3. The mobile device according to claim 1, wherein the first receive path and second receive path are selectively configured to pass signals from the first antenna and the second antenna to the baseband chipset via the first RF transceiver and the second RF transceiver.

4. A mobile device comprising:
a first antenna;
a second antenna;
a first radio frequency (RF) transceiver coupled to the first antenna;
a second RF transceiver coupled to the second antenna;
a baseband chipset coupled to the first RF transceiver and the second RF transceiver; and
at least one switch connected within a first transmit path, a second transmit path, a first receive path, and a second receive path, wherein one or more of the first transmit path, the second transmit path, the first receive path, and the second receive path associated with the coupling of one or more of the first antenna, the second antenna, the first RF transceiver, the second RF transceiver, and the baseband chipset,
wherein the first transmit path and second transmit path are configured to selectively pass signals from the baseband chipset to the first antenna and the second antenna via the first RF transceiver and the second RF transceiver,
wherein the first receive path and the second receive path are selectively configured to pass signals from the first antenna and the second antenna to the baseband chipset via the first RF transceiver and the second RF transceiver, and
wherein the at least one switch includes a first single pole four throw (SP4T) switch which connects the first antenna to the first RF transceiver and the second RF transceiver, and a second SP4T switch which connects the second antenna to the first RF transceiver and the second RF transceiver.

5. The mobile device according to claim 4, wherein the first transmit path includes a first conductive pathway and a first single pole single throw (SPST) switch between a first throw of the first SP4T switch and a first throw of the second SP4T switch, the second transmit path includes a second conductive pathway and a second SPST switch between a second throw of the first SP4T switch and a second throw of the second SP4T switch, the first receive path includes a third conductive pathway and a third SPST switch between a third throw of the first SP4T switch and a third throw of the second SP4T switch, and the second receive path includes a fourth conductive pathway and a fourth SPST switch between a fourth throw of the first SP4T switch and a fourth throw of the second SP4T switch.

6. A mobile device comprising:
a first antenna;
a second antenna;
a first radio frequency (RF) transceiver coupled to the first antenna;
a second RF transceiver coupled to the second antenna, wherein the second RF transceiver is physically separate and independent from the first RF transceiver;
a baseband chipset coupled to the first RF transceiver and the second RF transceiver; and
at least one switch connected within a first transmit path, a second transmit path different than the first transmit path, a first receive path, and a second receive path, wherein one or more of the first transmit path, the second transmit path, the first receive path, and the second receive path associated with the coupling of one or more of the first antenna, the second antenna, the first RF transceiver, the second RF transceiver, and the baseband chipset,
wherein the at least one switch includes a double pole double throw (2P2T) switch which connects the first antenna to the first RF transceiver and the second RF transceiver, and wherein the 2P2T switch connects the second antenna to the first RF transceiver and the second RF transceiver.

7. A mobile device comprising:
a first antenna;
a second antenna;
a first radio frequency (RF) transceiver coupled to the first antenna;
a second RF transceiver coupled to the second antenna, wherein the second RF transceiver is physically separate and independent from the first RF transceiver;
a baseband chipset coupled to the first RF transceiver and the second RF transceiver; and
at least one switch connected within a first transmit path, a second transmit path different than the first transmit path, a first receive path, and a second receive path, wherein one or more of the first transmit path, the second transmit path, the first receive path, and the second receive path associated with the coupling of one or more of the first antenna, the second antenna, the first RF transceiver, the second RF transceiver, and the baseband chipset,
wherein the at least one switch includes a quadruple pole double throw (4P2T) switch which connects the first antenna to the first RF transceiver and the second RF transceiver, and wherein the 4P2T switch connects the second antenna to the first RF transceiver and the second RF transceiver.

8. A mobile device comprising:
a first antenna;
a second antenna;
a first radio frequency (RF) transceiver coupled to the first antenna;
a second RF transceiver coupled to the second antenna;
a baseband chipset coupled to the first RF transceiver and the second RF transceiver; and
at least one switch connected within a first transmit path, a second transmit path, a first receive path, and a second receive path, wherein one or more of the first transmit path, the second transmit path, the first receive path, and the second receive path associated with the coupling of one or more of the first antenna, the second antenna, the first RF transceiver, the second RF transceiver, and the baseband chipset, wherein the at least one switch includes a first double pole double throw (2P2T) switch that connects a first transmit input of the first transceiver to one of a first transmit output and a second transmit output on the baseband chipset, and a second transmit input of the second transceiver to the first transmit output and the second transmit output on the baseband chipset, and wherein the at least one switch further includes a second 2P2T switch that connects a first receive output of the first transceiver to one of a first receive input and a second receive input on the baseband chipset, and a second receive output of the second transceiver to the first receive input and the second receive input on the baseband chipset.

9. A mobile device comprising:
a first antenna;
a second antenna;
a first radio frequency (RF) transceiver coupled to the first antenna;
a second RF transceiver coupled to the second antenna;
a baseband chipset coupled to the first RF transceiver and the second RF transceiver;
at least one switch connected within a first transmit path, a second transmit path, a first receive path, and a second receive path, wherein one or more of the first transmit path, the second transmit path, the first receive path, and the second receive path associated with the coupling of one or more of the first antenna, the second antenna, the first RF transceiver, the second RF transceiver, and the baseband chipset; and
a processor configured to:
  receive over a first RF link with the first RF transceiver a voice transmission signal through the first antenna;
  receive over a second RF link with the second RF transceiver a data transmission signal through the second antenna;
  evaluate the quality of the first RF link using first signals received through the first antenna;
  evaluate the quality of the second RF link using second signals received through the second antenna;
  operate the at least one switch to receive the voice transmission signal through the second antenna and receive the data transmission signal through the first antenna if the quality RF link of the second RF link is higher than the quality of the first RF link; and
  continue to receive the voice transmission signal through the first antenna and the data transmission signal through the second antenna if the quality RF link of the first RF link is higher than the quality of the second RF link.

10. A method comprising:
receiving over a first radio frequency (RF) link with a first transceiver a voice transmission signal through a first antenna of a mobile device;
receiving over a second RF link with a second transceiver a data transmission signal through a second antenna of the mobile device;
evaluating the quality of the first RF link using first signals received through the first antenna, wherein the first signals include first voice signals and first data signals;
evaluating the quality of the second RF link using second signals received through the second antenna, wherein the second signals include second voice signals and second data signals;
receiving the voice transmission signal through the second antenna and receiving the data transmission signal through the first antenna if the quality RF link of the second RF link is higher than the quality of the first RF link; and
continuing to receive the voice transmission signal through the first antenna and the data transmission signal through the second antenna if the quality RF link of the first RF link is higher than the quality of the second RF link.

11. The method according to claim 10, wherein the first signals include at least signals associated with the voice transmission signal, and the second signals include at least signals associated with the data transmission signal.

12. The method of claim 10, wherein receiving the voice transmission signal through the second antenna and receiving the data transmission signal through the first antenna includes switching a first signal pathway to connect the first antenna to the second transceiver, and switching a second signal pathway to connect the second antenna to the first transceiver.

13. The method of claim 10, wherein receiving the voice transmission signal through the second antenna and receiving the data transmission signal through the first antenna includes switching at least one of signal pathway between the first transceiver and a baseband chipset, and switching at least one signal pathway between the second transceiver and the baseband chipset.

* * * * *